(12) United States Patent
Liu et al.

(10) Patent No.: US 10,885,305 B2
(45) Date of Patent: Jan. 5, 2021

(54) FINGERPRINT IDENTIFICATION STRUCTURE AND METHOD FOR FABRICATING THE SAME

(71) Applicant: BOE TECHNOLOGY GROUP CO., LTD., Beijing (CN)

(72) Inventors: Yingming Liu, Beijing (CN); Jing LV, Beijing (CN); Haisheng Wang, Beijing (CN); Chun Wei Wu, Beijing (CN); Xiaoliang Ding, Beijing (CN); Rui Xu, Beijing (CN); Lijun Zhao, Beijing (CN); Changfeng Li, Beijing (CN); Yanan Jia, Beijing (CN); Yuzhen Guo, Beijing (CN); Yunke Qin, Beijing (CN); Pinchao Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 166 days.

(21) Appl. No.: 16/301,917

(22) PCT Filed: Apr. 16, 2018

(86) PCT No.: PCT/CN2018/083181
§ 371 (c)(1),
(2) Date: Nov. 15, 2018

(87) PCT Pub. No.: WO2019/024538
PCT Pub. Date: Feb. 7, 2019

(65) Prior Publication Data
US 2019/0286878 A1      Sep. 19, 2019

(30) Foreign Application Priority Data

Jul. 31, 2017  (CN) .......................... 2017 1 0641275

(51) Int. Cl.
*G06K 9/00*      (2006.01)
*G06F 3/044*     (2006.01)

(52) U.S. Cl.
CPC ....... *G06K 9/00087* (2013.01); *G06F 3/0446* (2019.05); *G06K 9/0004* (2013.01)

(58) Field of Classification Search
CPC . G06K 9/00087; G06K 9/0004; G06F 3/0446
See application file for complete search history.

(56) References Cited

U.S. PATENT DOCUMENTS

| 2014/0218638 A1 | 8/2014 | Kang et al. |
| 2017/0091508 A1 | 3/2017 | Han et al. |

(Continued)

FOREIGN PATENT DOCUMENTS

| CN | 201600673 U  | 10/2010 |
| CN | 102043538 A  | 5/2011  |

(Continued)

OTHER PUBLICATIONS

International Search Report and Written Opinion dated Jun. 27, 2018 from State Intellectual P.R. China Property Office of the P.R. China.

*Primary Examiner* — Abhishek Sarma
(74) *Attorney, Agent, or Firm* — Dilworth & Barrese, LLP.; Michael J. Musella, Esq.

(57) ABSTRACT

A fingerprint identification structure and a method for fabricating the same, and an electronic device are provided. The fingerprint identification structure includes: a substrate; a plurality of first touch control electrodes and a plurality of second touch control electrodes, which are provided on the substrate, in which the plurality of first touch control electrodes and the plurality of second touch control electrodes intersect with each other; and a plurality of photo-sensitive patterns, which are disposed at intersections of the plurality of first touch control electrodes and the plurality of second (Continued)

touch control electrodes, respectively, and are configured to separate the plurality of second touch control electrodes from the plurality of first touch control electrodes.

17 Claims, 5 Drawing Sheets

(56) References Cited

U.S. PATENT DOCUMENTS

2017/0124373 A1* 5/2017 Liao .................. H01L 27/14612
2017/0316251 A1 11/2017 Li

FOREIGN PATENT DOCUMENTS

| CN | 105389552 A | 3/2016 |
| CN | 106557216 A | 4/2017 |
| CN | 107392168 A | 11/2017 |

* cited by examiner

FINGERPRINT IDENTIFICATION STRUCTURE AND METHOD FOR FABRICATING THE SAME

The present application claims priority to Chinese patent application No. 201710641275.7, filed on Jul. 31, 2017, the entire disclosure of which is incorporated herein by reference as part of the present application.

TECHNICAL FIELD

At least one embodiment of the present disclosure relates to a fingerprint identification structure and a method for fabricating the same.

BACKGROUND

Recently, fingerprint identification technologies (including palmprint identification technologies) have been continuously developed and widely employed in various electronic devices for access control, authority control, etc. Fingerprint identification capability and palmprint identification capability can be realized by various technologies such as optical identification technology, capacitance identification technology, ultrasonic identification technology, etc.

SUMMARY

An embodiment of the present disclosure provides a fingerprint identification structure, which comprises: a substrate; a plurality of first touch control electrodes and a plurality of second touch control electrodes, which are provided on the substrate, wherein the plurality of first touch control electrodes and the plurality of second touch control electrodes intersect with each other; and a plurality of photo-sensitive patterns, which are disposed at intersections of the plurality of first touch control electrodes and the plurality of second touch control electrodes, respectively, and are configured to separate the plurality of second touch control electrodes from the plurality of first touch control electrodes.

In the fingerprint identification structure provided by an embodiment of the present disclosure, for example, each of the photo-sensitive patterns with one of the first touch control electrodes and one of the second touch control electrodes, which are separated from each other by the each of the photo-sensitive patterns, form a photodiode.

In the fingerprint identification structure provided by an embodiment of the present disclosure, for example, the photo-sensitive patterns are photoresistors.

In the fingerprint identification structure provided by an embodiment of the present disclosure, for example, the plurality of second touch control electrodes are provided on a side, which is away from the substrate, of the plurality of first touch control electrodes; and the second touch control electrodes comprise first parts covering the photosensitive patterns and second parts not covering the photo-sensitive patterns, and at least first parts are made of a transparent conductive material.

In the fingerprint identification structure provided by an embodiment of the present disclosure, for example, the first parts are made of ITO, and the second part are made of metal.

In the fingerprint identification structure provided by an embodiment of the present disclosure, for example, the first parts and the second parts are electrically connected by lap joints or through-holes.

The fingerprint identification structure provided by an embodiment of the present disclosure, for example, further comprises an insulation layer covering the first touch control electrodes, wherein the insulation layer is disposed between the plurality of first touch control electrodes and the plurality of photo-sensitive patterns; the insulation layer comprises a plurality of through-holes which have a one-to-one correspondence with the plurality of photosensitive patterns; and each of the photo-sensitive patterns connects to one of the first touch control electrodes by a corresponding through-hole of the through-holes.

In the fingerprint identification structure provided by an embodiment of the present disclosure, for example, the photo-sensitive patterns are made of an infrared photo-sensitive material.

In the fingerprint identification structure provided by an embodiment of the present disclosure, for example, the infrared photo-sensitive material comprises one or any combination of PBDTT, PC61BM, P3HT, PEDOT or PSS.

The fingerprint identification structure provided by an embodiment of the present disclosure, for example, further comprises a back-light, provided on a side, which is away from the first touch control electrodes and the second touch control electrodes, of the substrate.

In the fingerprint identification structure provided by an embodiment of the present disclosure, for example, the substrate is a display substrate or a base substrate of a display substrate.

An embodiment of the present disclosure provides a method for fabricating a fingerprint identification structure, which comprises: forming a plurality of first touch control electrodes and a plurality of second touch control electrodes on a substrate, wherein the plurality of first touch control electrodes and the plurality of second touch control electrodes intersect with each other; and forming a plurality of photo-sensitive patterns on the substrate, wherein the plurality of photo-sensitive patterns are disposed at intersections of the plurality of first touch control electrodes and the plurality of second touch control electrodes, respectively, and are configured to separate the plurality of second touch control electrodes from the plurality of first touch control electrodes.

In the method for fabricating a fingerprint identification structure provided by an embodiment of the present disclosure, for example, each of the photo-sensitive patterns with one of the first touch control electrodes and one of the second touch control electrodes, which are separated from each other by the each of the photo-sensitive patterns, form a photodiode; or, the photo-sensitive patterns are photoresistors.

The method for fabricating a fingerprint identification structure provided by an embodiment of the present disclosure, for example, further comprises: forming an insulation layer covering the first touch control electrodes, and patterning the insulation layer to form a plurality of through-holes; and forming the plurality of photo-sensitive patterns, to allow the plurality of photo-sensitive patterns to have a one-to-one correspondence with the plurality of through-holes and the plurality of photo-sensitive patterns to connect to the first touch control electrodes by a corresponding through-hole of the through-holes.

In the method for fabricating a fingerprint identification structure provided by an embodiment of the present disclosure, for example, forming of the second touch control electrodes comprises: depositing a transparent conductive material on the substrate on which the plurality of photo-sensitive patterns are formed, and patterning the transparent conductive material to form first parts, which covers the photo-sensitive patterns, of the second touch control electrodes; and depositing a second electrode material on the substrate, and patterning the second electrode material to obtain second parts, which do not cover the photo-sensitive patterns, of the second touch control electrodes, wherein the first parts electrically connect with the second parts to form the second touch control electrodes together.

In the method for fabricating a fingerprint identification structure provided by an embodiment of the present disclosure, for example, the first parts and the second parts are electrically connected by lap joints or through-holes.

An embodiment of the present disclosure further provides an electronic device, which comprises the fingerprint identification structure provided by any one of the embodiments of the present disclosure.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
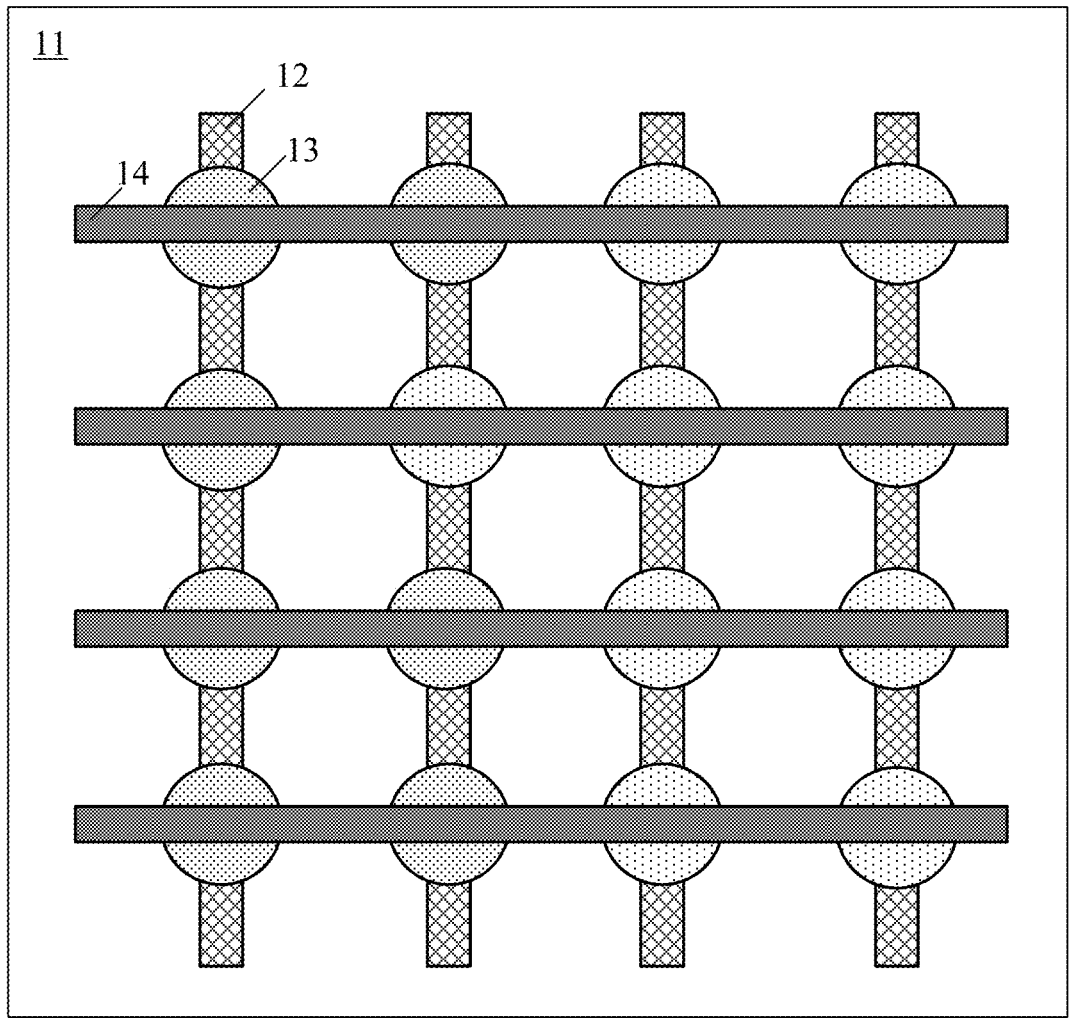
FIG. 1 and FIG. 2 are structural schematic diagrams of fingerprint identification structures provided by an embodiment of the present disclosure, respectively.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not limited to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For example, fingerprint identification function (including palmprint identification function) may be integrated in a display screen, so that the fingerprint or the palmprint of a user can be identified by the display screen. An implementation of screen fingerprint identification comprises providing a capacitive fingerprint identification structure on a display substrate. The fingerprint identification structure comprises a plurality of transverse electrodes Tx1-Txn extending along a horizontal direction and a plurality of longitudinal electrodes Rx1-Rxm extending along a vertical direction, and the transverse electrodes Tx1-Txn and the longitudinal electrodes Rx1-Rxm are formed on the display substrate. The transverse electrodes Tx1-Txn and the longitudinal electrodes Rx1-Rxm intersect with each other, such that induced capacitances are formed at intersections of the transverse electrodes and the longitudinal electrodes. In a fingerprint identification stage, a progressive scanning identification is, for example, performed; firstly, sequentially receiving signals from the longitudinal electrodes Rx1 to Rxm when inputting a driving signal to the transverse electrode Tx1 (Tx2 to Txn are grounded), and then sequentially receiving signals from the longitudinal electrodes Rx1 to Rxm when inputting a driving signal to Tx2, . . . , until sequentially receiving signals from the longitudinal electrodes Rx1 to Rxm when inputting a driving signal to Txn, where n and m are both integers greater than 2.

When a finger presses the screen, the valleys or ridges of the finger can change the mutual capacitance between the transverse electrodes Tx and the longitudinal electrodes Rx, in which the valleys are farther away from the screen and have a less effect, while the ridges are closer to the screen and have a greater effect, thus the change of the mutual capacitance of the capacitive structure induced by the valleys are different from the change of the mutual capacitance induced by the ridges, and therefore the valleys or the ridges can be determined based on the differences, and the lines of a fingerprint can be identified.

However, for the above-mentioned capacitive fingerprint identification structure, the difference between the signal induced by the valleys and the signal induced by the ridges can be relatively small. For example, for implementing the fingerprint identification function with a screen, the outermost layer of the screen is a protection layer covering the transverse electrodes and the longitudinal electrodes, and the signals of the valleys and the ridges can be significantly attenuated along with an increase of the thickness of the protection layer, and this lowers the accuracy of the fingerprint identification.

At present, for a display substrate with the capacitive fingerprint identification structure, the protection layer of the display substrate can only have a thickness of about 0.3 mm if a silicon-based protection layer is adopted, and the protection layer of the display substrate can only have a thickness of about 150 μm if a glass-based protection layer is adopted. The thickness of each of the aforementioned protection layers is insufficient to satisfy the strength requirement for the outer layer of the screen; this can make the above-mentioned fingerprint identification solution impractical.

An embodiment of the present disclosure provides a fingerprint identification structure, as illustrated in FIG. 1, the fingerprint identification structure comprises: a base substrate 11, a plurality of first touch control electrodes 12, a plurality of second touch control electrodes 14, and a plurality of photo-sensitive patterns 13. The first touch control electrodes 12 and the second touch control electrodes 14 are provided on the substrate 11 and can also be referred to as fingerprint identification electrodes.

In FIG. 1, the plurality of first touch control electrodes 12 extend along a vertical direction, and the plurality of second touch control electrodes 14 extend along a horizontal direction to intersect with the plurality of first touch control electrodes 12, such that detection capacitances are formed at the intersections of the first touch control electrodes 12 and the second touch control electrodes 14, and the detection capacitances are used for implementing capacitive touch control detection. The plurality of photo-sensitive patterns 13 are respectively disposed at corresponding intersections of the plurality of first touch control electrodes 12 and the plurality of second touch control electrodes 14. The plurality of photo-sensitive patterns 13 are configured to separate the second touch control electrodes 14 from the first touch control electrodes 12, and the second touch control electrodes 14 and the first touch control electrodes 12 are disposed at opposite sides of the plurality of photo-sensitive patterns 13. In other examples, the plurality of second touch control electrodes 14 and the plurality of first touch control electrodes 12 may intersect with each other but are not perpendicular to each other.

In an embodiment of the present disclosure, for example, the first touch control electrodes 12 and the second touch control electrodes 14 are respectively connected to a touch control detection circuit (not illustrated in FIG. 1) through corresponding leads, so as to perform touch control detection, and the touch control detection circuit is, for example, a touch control detection chip.

In an example of the embodiment, each of the photo-sensitive patterns 13 with one of the first touch control electrodes 12 and one of the second touch control electrodes 14, which are separated from each other by each of the photo-sensitive patterns 13, form a photodiode. In the example, each of the photo-sensitive patterns 13 may adopt a PN structure or a PIN structure, so as to form the photodiode. A photodiode with the PN structure comprises a P-type semiconductor layer and an N-type semiconductor layer, which are adjacent to each other, the P-type semiconductor layer and the N-type semiconductor layer are respectively in electrically contact with one of the first touch control electrodes 12 and one of the second touch control electrodes 14, or in electrically contact with one of the second touch control electrodes 14 and one of the first touch control electrodes 12. In addition to the P-type semiconductor layer and the N-type semiconductor layer as mentioned above, a photodiode with the PIN structure further comprises an I-type semiconductor layer (namely an intrinsic semiconductor layer) disposed between the P-type semiconductor layer and the N-type semiconductor layer. For example, the semiconductor layer for forming the aforementioned photodiode may be made of inorganic semiconductor materials or organic semiconductor materials; for example, the inorganic semiconductor materials comprise silicon, germanium, selenium and gallium arsenide, etc., and the organic semiconductor materials comprise small-molecule type organic semiconductor materials, such as pentacene, triphenylamine, fullerene, phthalocyanine, perylene dericatives and cyanine, etc., or high polymer type organic semiconductor materials, such as polyacetylene type, polyaromatic type and copolymer type, etc., in which polyaromatic type comprises polyphenylene, polythiophene, polyaniline, polypyrrole, etc. The above-mentioned materials may be doped to obtain corresponding N-type or P-type materials, and no further descriptions will be given in this respect. For example, the photodiode may sense and detect infrared light or visible light, etc.

In order to further enable the photodiode to output a stable photocurrent, in one embodiment, the photo-sensitive patterns 13 are made of an infrared photo-sensitive material, such as one or any combination of PBDTT, PC61BM, P3HT, PEDOT or PSS. The above-mentioned materials have good photo-sensitivity with respect to near-infrared light. The near-infrared light is an important light in short wavelength range. It has been found in research that the photodiodes have high gain for the light in the short wavelength range, and nearly 50% of the visible light is within near-infrared wavelength range.

With the photo-sensitive patterns 13 made of the aforementioned materials, the photodiode of the present embodiment may output a more stable photocurrent based on the photo-sensitive effect in response to the near-infrared light, and the more stable photocurrent is in favor of improving the accuracy of fingerprint identification.

In another example of the embodiment, each of the photo-sensitive patterns forms a photoresistor, and the resistance of which decreases in the presence of light. The photoresistor may be a photoresistor based on intrinsic semiconductor or a photoresistor based on doped semiconductor, and the semiconductor material adopted by the photoresistor may be an inorganic semiconductor material or an organic semiconductor material, in which the inorganic semiconductor material comprises silicon, germanium, cadmium sulfide, cadmium selenide, lead sulfide, lead selenide or zinc oxide, etc., and the organic semiconductor material comprises phthalocyanine, polyvinyl carbazole, squaric acid dyes or azo dyes, etc. For example, the photo-sensitive wavelength range of the photoresistor may be the wavelength range corresponding to infrared light or visible light and so on.

An embodiment of the present disclosure provides the photo-sensitive patterns between the first touch control electrodes and the second touch control electrodes, so as to form the structures of the photodiodes. When the light reflected by a finger is incident onto the photodiodes, the photodiodes can generate a photocurrent, so as to increase the difference between the signal induced by the valleys and the signal induced by the ridges of the fingerprint, this enables the lines of the fingerprint to be identified more accurately, and allows the requirements to the distance between the finger and the first touch control electrodes and the distance between the finger and the second touch control electrodes to be lowered. Therefore, a thicker protection layer can be provided thereafter, so as to achieve a robust structure. Obviously, the technical solution of the present embodiment can enable the fingerprint identification structure to apply in the screen, and thus has relatively high practical value.

In an example of the embodiment, the plurality of second touch control electrodes 14 are provided on the side, which is away from the substrate 11, of the plurality of first touch control electrodes 12, that is, the second touch control electrodes are provided above the photo-sensitive patterns 13 (closer to the paper upper surface).

Figure 2:
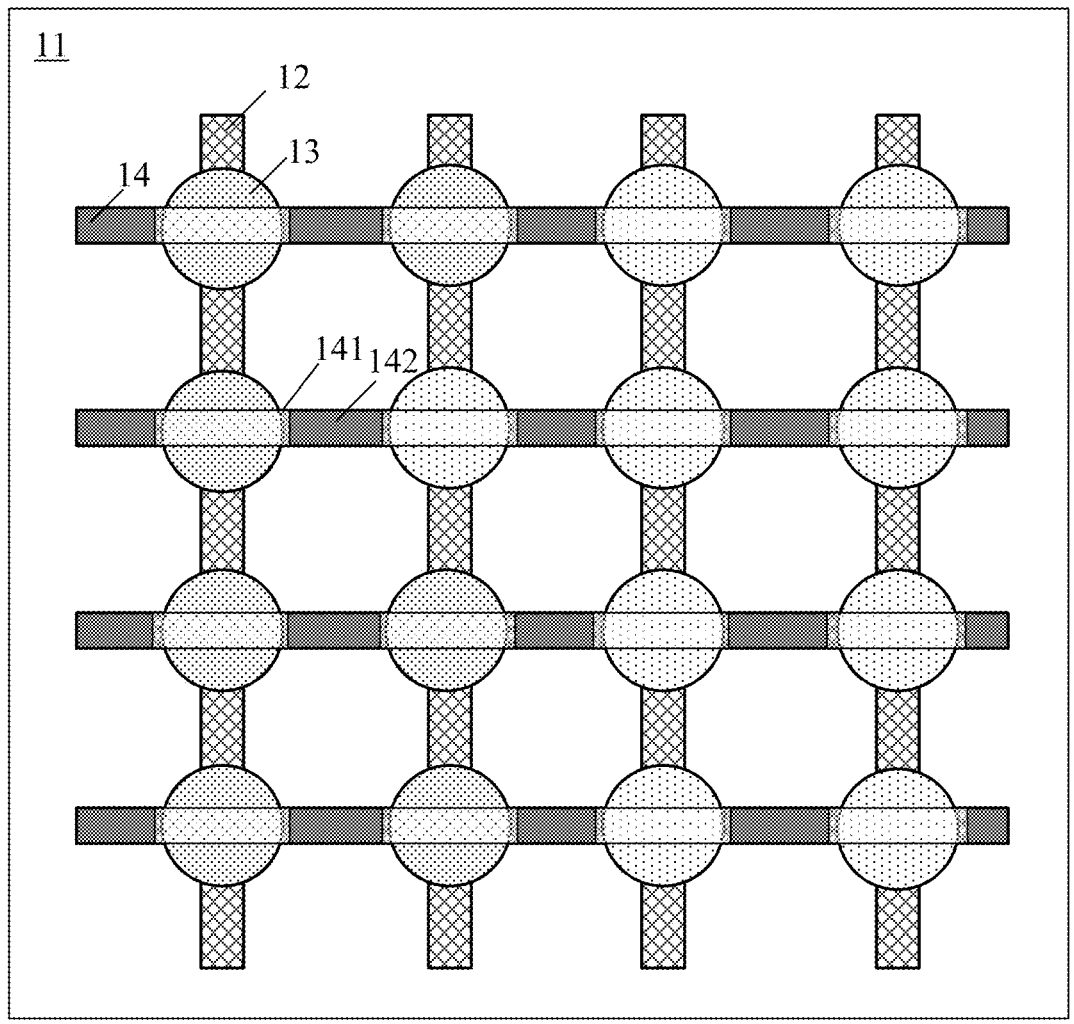

In order to avoid the second touch control electrodes 14 blocking the light propagate toward the photo-sensitive patterns 13, in an example, as illustrated in FIG. 2, on the basis of the structure illustrated in FIG. 1, the second touch control electrodes 14 of the embodiment comprise first parts 141 covering the photosensitive patterns 13 and second parts 142 not covering the photo-sensitive patterns 13; at least the first parts 141 are made of a transparent conductive material (such as indium tin oxide (ITO), indium zinc oxide (IZO), etc.). In this case, the second touch control electrodes extending along the horizontal direction comprise the first parts 141 and the second parts 142 which are alternately arranged and electrically connected. The first parts 141 and the second parts 142 may be electrically connected by lap joints (referring to FIG. 4E), or may be electrically connected by through-holes (referring to FIG. 4F). The second parts 142 not covering the photo-sensitive patterns 13 may be opaque, and for example, made of a metallic material, the metallic material is, for example, aluminium or aluminium alloy, copper or copper alloy, etc. The first touch control electrodes 12 may also be made of the metallic material similar to the metallic material of the second parts 142.

According to the design of the structure, it can be known that the first parts 141, covering the photo-sensitive patterns 13, of the second touch control electrodes 14 in the present embodiment, has a certain degree of light transmission capability, such that the light propagate toward the photo-sensitive patterns 13 is not blocked by the second touch control electrodes 14, this ensures the photo-sensitive patterns 13 to collect sufficient light, and allows the photoelectronic conversion of the photo-sensitive patterns 13 to be adequate, such that the photocurrent can be generated effectively.

As another feasible solution, the entire second touch control electrode of the present embodiment may be made of a transparent conductive material.

The structure of the fingerprint identification structure of the embodiment is described in detail hereinafter with reference to practical applications.

Exemplarily, the fingerprint identification structure of the embodiment is applied in the display screen, and therefore, the base substrate of the fingerprint identification structure can be served as the display substrate of the display screen or the array substrate of a display substrate, etc.

Figure 3A:
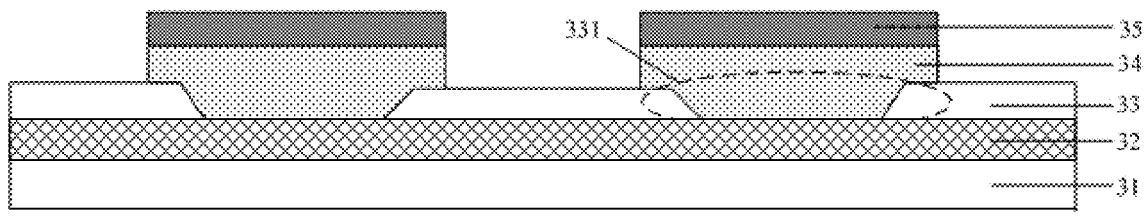
FIG. 3A to FIG. 3C are structural schematic diagrams of fingerprint identification structures provided by an embodiment of the present disclosure.

As illustrated in the cross-sectional view of FIG. 3A, in an embodiment of the present disclosure, the array substrate 31 of the display substrate serves as the base substrate of the fingerprint identification structure, and the following structures are formed on the array substrate 31: a plurality of first touch control electrodes 32, an insulation layer 33 covering the first touch control electrodes 32, a plurality of photo-sensitive patterns 34 formed on the insulation layer 33, and a plurality of second touch control electrodes 35. A plurality of through-holes 331 are formed in the insulation layer 33; and the plurality of through-holes 331 in the insulation layer 33 have a one-to-one correspondence with the plurality of photo-sensitive patterns 34, to allow each of the plurality of photo-sensitive patterns 34 to connect to one of the first touch control electrodes 32 by a corresponding through-hole of the through-holes 331. Each of the plurality of second touch control electrodes 35 is separated from the first touch control electrodes 32 by one of the photo-sensitive patterns 34.

For example, in the present embodiment, a package layer or a package cover plate (not illustrated in FIG. 3A) may be further provided on the second touch control electrodes 35, and the package layer or the package cover plate serves as a display surface and a touch control operating surface, and a touch control operation can be performed on the touch control operating surface by, for example, a human finger.

For example, the display substrate is an organic light-emitting diode (OLED) display substrate; the array substrate 31 comprises an array of display pixels; and each of the display pixels comprises a pixel driving circuit and a light-emitting component, etc. (not illustrated in figures). The light emitted by the array of the display pixels may pass through the first touch control electrodes 32 and the second touch control electrodes 35, and be incident onto the finger, which performs the touch control operation, of the user, thereby enhancing the light reflected by the finger of the user, and further ensuring the accurate identification of fingerprint.

Figure 3B:
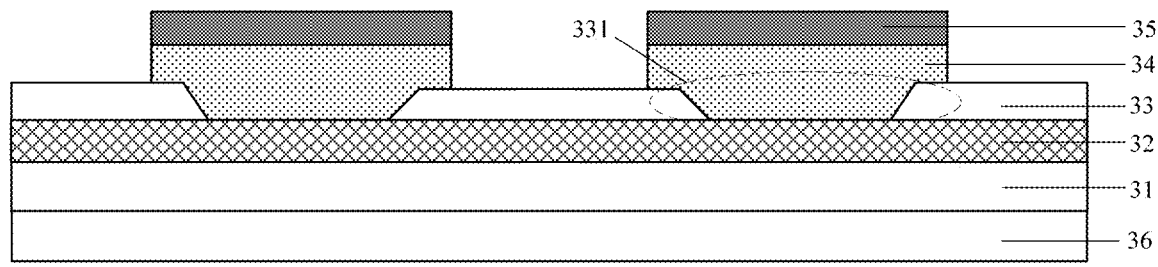

In another example of the present embodiment, as illustrated in a cross-sectional view of FIG. 3B, the display substrate may further comprises a back-light 36 provided on the side, which is away from the first touch control electrodes 32 and the second touch control electrodes 35, of the array substrate 31. The light emitted by the back-light 36 may pass through the first touch control electrodes 32 and the second touch control electrodes 35, and be incident onto the finger of the user, thereby enhancing the light reflected by the finger of the user, and further ensuring the accurate identification of fingerprint. The display substrate is, for example, a liquid crystal display substrate or an electronic ink display substrate, and accordingly, other structures, including a pixel circuit, etc., for implementing the liquid crystal display or the electronic ink display are formed on the array substrate 31. The back-light 36 may be of various suitable types, such as a side-lit type back-light or a direct-lit type back-light, and the specific structures of the back-light are not described here.

In still another example, on the basis of the above descriptions, photo-shielding patterns may be further provided between the back-light 36 and the photo-sensitive patterns 34 on the display substrate of the present embodiment; the photo-shielding patterns can prevent the light of the back-light 36 from directly illuminating the photo-sensitive patterns 34, and prevent the back-light 36 from affecting or interfering the photo-sensitive patterns 34, so that the photo-sensitive patterns 34 can generate photocurrent based on the photoelectronic effect in response to only the light reflected by the finger of the user.

Figure 3C:
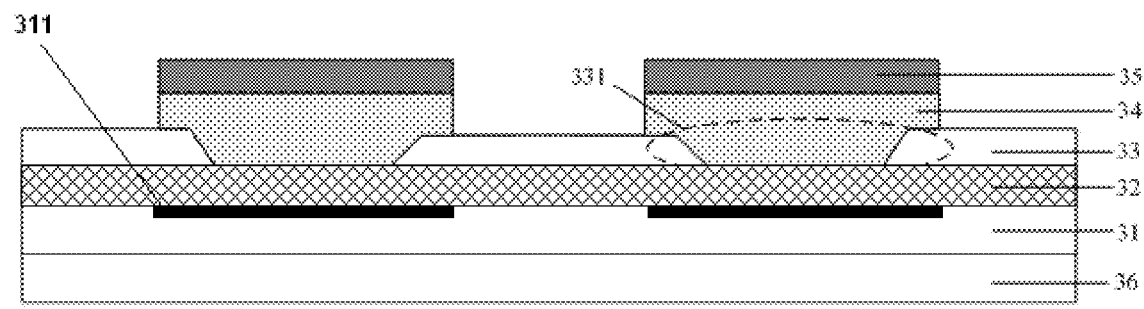

For example, in order to simplify the structure, the first touch control electrodes 32 of the present embodiment may be made of an opaque conductive material, such that the first touch control electrodes 32 can be used as the photo-shielding patterns; or as illustrated in FIG. 3C, the photo-shielding patterns 311 are separately provided on the array substrate 31. The photo-shielding patterns 311 may be made of an opaque material, such as a black resin or a metal oxide, etc.

Compared with the above-mentioned related fingerprint identification structure, the fingerprint identification structure of the present embodiment addresses the problem that the difference between the signal induced by the valleys and the signal induced by the ridges are relatively small, so that a thicker protection layer can be provided on the fingerprint identification structure, this allows the fingerprint identification structure can be applied in the display screen in practical applications.

In addition, an embodiment of the present disclosure further provides a method for fabricating a fingerprint identification structure, corresponding to the fingerprint identification structure in the aforementioned embodiment, the method comprises: forming a plurality of first touch control electrodes and a plurality of second touch control electrodes on a base substrate; and forming a plurality of photo-sensitive patterns on the base substrate. For example, the base substrate may be the array substrate of a display substrate or a display substrate itself.

For example, the plurality of first touch control electrodes and the plurality of second touch control electrodes intersect with each other; the plurality of photo-sensitive patterns are disposed at intersections of the plurality of first touch control electrodes and the plurality of second touch control electrodes, respectively, and are configured to separate the plurality of second touch control electrodes from the plurality of first touch control electrodes. For example, each of the photo-sensitive patterns with one of the first touch control electrodes and one of the second touch control electrodes, which are separated from each other by the each of the photo-sensitive patterns, form a photodiode; or, the photo-sensitive patterns serve as photoresistors.

Obviously, the method of the present embodiment can be used to fabricate the aforementioned fingerprint identification structure provided by the present disclosure, thereby, the technical effects that can be achieved by the fingerprint identification structure can also be achieved by the method of the present embodiment.

Hereinafter, with reference to FIG. 4A to FIG. 4E, the method for fabricating the fingerprint identification structure of the embodiment of the present disclosure will be described in detail.

Figure 4A:
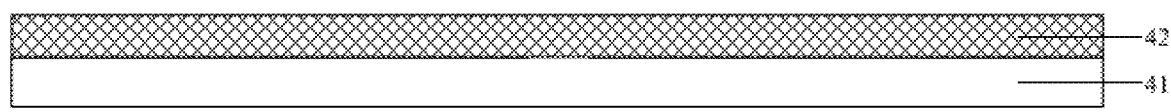
FIG. 4A to FIG. 4F are schematic diagrams illustrating detailed process of a method for fabricating a fingerprint identification structure provided by an embodiment of the present disclosure.

Referring to FIG. 4A, the method comprises: forming a plurality of the first touch control electrodes 42 from a first electrode material by depositing the first electrode material on a base substrate 41, and patterning the first electrode material by a patterning process.

For example, the base substrate 41 is a glass substrate or a plastic substrate, and the base substrate may also be the display substrate of a display screen or the array substrate of a display substrate. The first electrode material is, for example, a metallic material, such as aluminum or an aluminum alloy, copper or copper alloy.

Figure 4B:
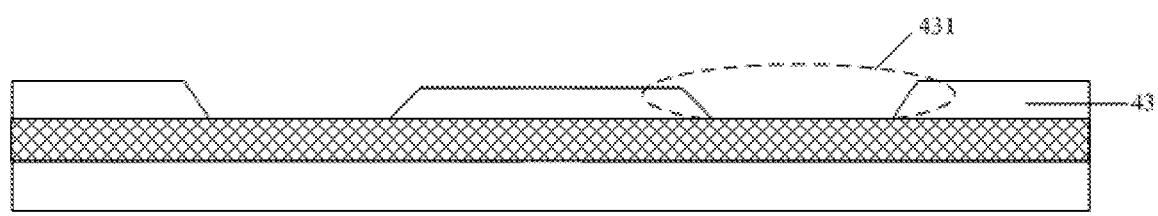

Referring to FIG. 4B, the method further comprises: forming an insulation layer 43 covering the first touch control electrodes 43, and patterning the insulation layer to form a plurality of through-holes 431 in the insulation layer 43.

The insulation layer 43 may be an inorganic insulation layer (such as silicon oxide) or an organic insulation layer (such as an organic resin), etc.

Figure 4C:
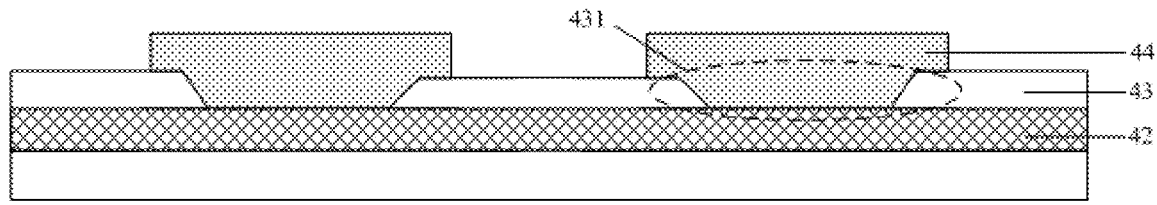

Referring to FIG. 4C, the method further comprises: forming a plurality of photo-sensitive patterns 44, and the photo-sensitive patterns 44 have a one-to-one correspondence with the plurality of through-holes 431, and connect to the first touch control electrodes 42 by corresponding through-holes.

As described above, in different examples, the photo-sensitive patterns may be photodiodes or photoresistors. For example, in order to form PN-type silicon photodiodes, a P-type silicon layer can be firstly formed on the first touch control electrodes 42 on the base substrate 41, and then an N-type silicon layer can be formed on the P-type silicon layer, thus forming a PN structure.

Figure 4D:
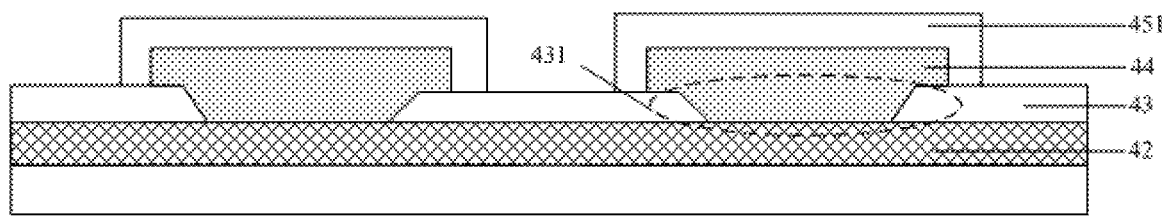

Referring to FIG. 4D, the method further comprises: depositing a transparent conductive material on the base substrate 41 on which the plurality of photo-sensitive patterns 44 are formed; and patterning the transparent conductive material by a patterning process, to form first parts 451, which covers the photo-sensitive patterns, of the second touch control electrodes.

The transparent conductive material is, for example, indium tin oxide (ITO) or indium zinc oxide (IZO).

Figure 4E:
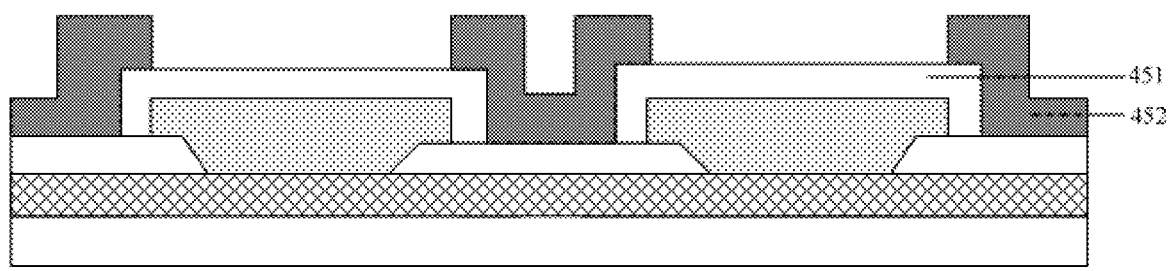

Referring to FIG. 4E, the method further comprises: depositing a second electrode material on the base substrate, and patterning the second electrode material by a patterning process, to obtain second parts 452, which are formed of the second electrode material and do not cover the photo-sensitive patterns, of the second touch control electrodes, in which the first parts 451 and the second parts 452 are electrically connected with each other by lap joints to form the second touch control electrodes 45.

For example, the second electrode material is a metallic material, such as aluminum or aluminum alloy, copper or copper alloy. On the base substrate 41, the extending direction of the second touch control electrodes 45 and the extending direction of the first touch control electrodes 42 intersect with each other, for example, perpendicular to each other, for example, see a plan view as illustrated in FIG. 2.

Figure 4F:
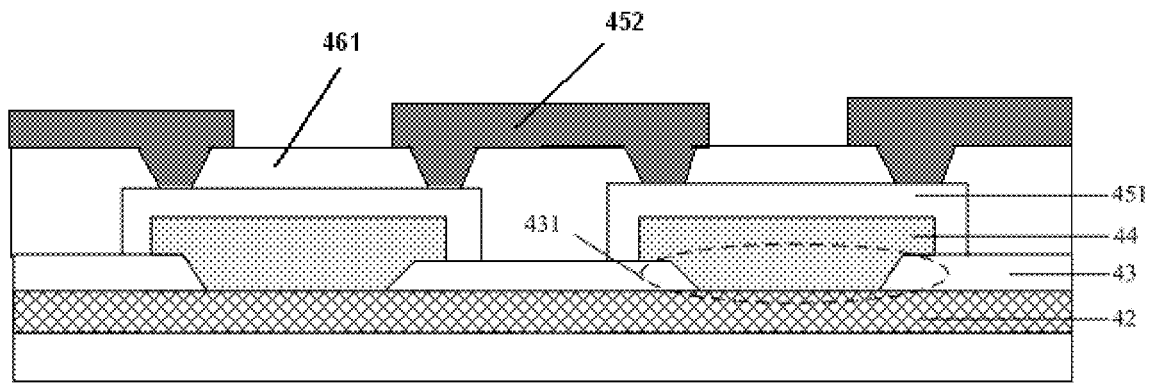

In another example, as illustrated in FIG. 4F, the method further comprises: depositing a transparent insulation layer 461 on the base substrate to cover the base substrate and the photo-sensitive patterns and the first parts 451 of the second touch control electrodes on the base substrate; and patterning the insulation layer 461 to form through-holes that expose the first parts 451. The material of the insulation layer 461 may be an inorganic insulation material, such as silicon oxide, silicon nitride or silicon oxynitride, or an organic insulation material, such as an organic resin. Thereafter, the method further comprises: forming a second electrode material on the insulation layer 461, and patterning the second electrode material by a patterning process, to obtain second parts 452, which are formed of the second electrode material and do not cover the photo-sensitive patterns, of the second touch control electrodes, in which the first parts 451 and the second parts 452 are electrically connected with each other by through-holes in the insulation layer 461 to form the second touch control electrodes 45. For example, the second electrode material is a metallic material, such as aluminum or aluminum alloy, copper or copper alloy. Similarly, on the base substrate 41, the extending direction of the second touch control electrodes 45 and the extending direction of the first touch control electrodes 42 intersect with each other, for example, perpendicular to each other, for example, see a plan view as illustrated in FIG. 2.

Moreover, an embodiment of the present disclosure provides an electronic device, which comprises the fingerprint identification structure according to any one of the aforementioned embodiments. For example, the electronic device may be implemented as any one of products or components with a display function, such as a liquid crystal panel, an electronic paper display panel, an organic light-emitting diode (OLED) panel, a mobile phone, a tablet computer, a television, a display, a notebook computer, a digital photo frame or a navigator, etc.

Figure 5:
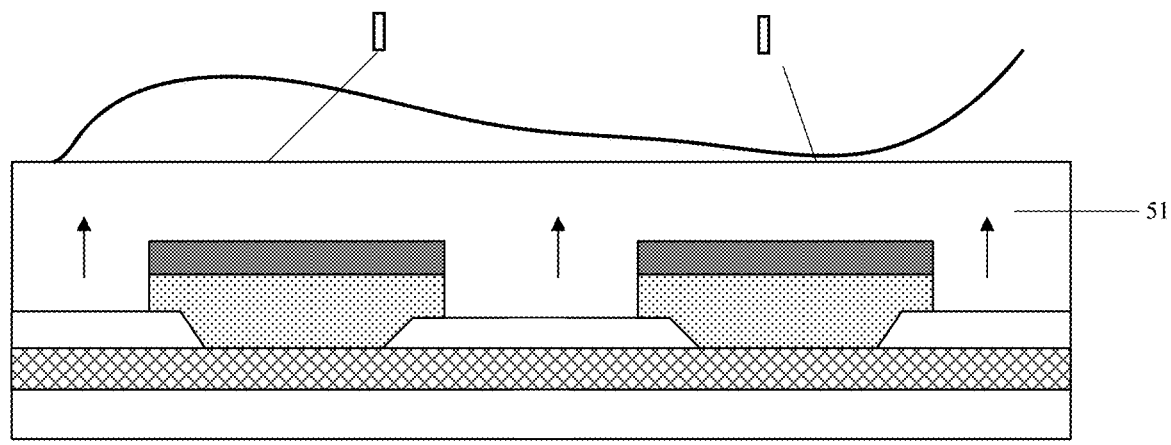
FIG. 5 is a schematic diagram illustrating working process of an electronic device provided by an embodiment of the present disclosure.

Referring to FIG. 5, a protection layer 51 is further formed on the fingerprint identification structure according to any one of the embodiments of the present disclosure, and the protection layer may be an insulation layer, a package film or a package cover plate, etc. The incidence light (for example, the light for display, referring to the arrows of FIG. 5), from a side at which the base substrate (for example, the display substrate) is located, is incident onto the finger which performs the touch control operation. The curve as illustrated in FIG. 5 is an outline of the fingerprint of the user. When the finger touches the protection layer 51, a valley of the fingerprint is located on position ① of the protection layer 51 as illustrated in FIG. 5, and a ridge of the fingerprint is located on position ② of the protection layer 51 as illustrated in FIG. 5. It can be seen that because the ridge is closer to the fingerprint identification structure below, the detection capacitance of the position corresponding to the ridge is more affected by the finger, thereby generating a stronger signal, while the detection capacitance of the position corresponding to the valley is less affected by the finger, thereby generating a weaker signal. At the same time, because the ridge is closer to the fingerprint identification structure below and clings tightly to (in contact with) the surface of a display device, thereby, interfaces are fewer and the light beams reflected downward by the ridge is more than the light beams reflected downward by the valley; these reflected light beams are incident onto the photo-sensitive patterns corresponding to the detection positions, and the photo-sensitive patterns generate photocurrents, in which the photocurrent generated by the photo-sensitive pattern corresponding to the ridge is larger, thereby the detection capacitance corresponding to the ridge generates a stronger signal, while the photocurrent generated by the photo-sensitive pattern corresponding to the valley is smaller, so the detection capacitance corresponding to the valley generates a weaker signal. Due to a superposition of the aforementioned effects, the fingerprint identification structure of the embodiment of the present disclosure can further increase the intensity of the signal induced by the ridges, which enlarges the difference between the intensity of the signal generated by the positions corresponding to the ridges and the intensity of the signal generated by the positions corresponding the valleys, thus enabling the lines of the fingerprint to be identified more easily; in this way, the thickness of the protection layer 51 can be appropriately increased, for example, more than 0.3 mm, so that the strength of the protection layer 51 can meet the requirements for serving as the outermost layer of the screen, that is, the technical solution of screen fingerprint identification can be implemented.

In the method embodiments of the present disclosure, the sequence numbers of the steps are not used to limit the execution sequence of the steps. Those skilled in the art can obtain other execution sequence of the steps, without any inventive work, which should be within the scope of the present disclosure.

The foregoing descriptions are merely the exemplary embodiments of the present disclosure, which are not intended to limit the scope of the present disclosure. The scope of the present disclosure is defined by the appended claims.

What is claimed is:

1. A fingerprint identification structure, comprising:
   a substrate;
   a plurality of first touch control electrodes and a plurality of second touch control electrodes, which are provided on the substrate, wherein the plurality of first touch control electrodes and the plurality of second touch control electrodes intersect with each other; and
   a plurality of photo-sensitive patterns, which are disposed at intersections of the plurality of first touch control electrodes and the plurality of second touch control electrodes, respectively, and are configured to separate the plurality of second touch control electrodes from the plurality of first touch control electrodes,
   wherein the plurality of second touch control electrodes are provided on a side, which is away from the substrate, of the plurality of first touch control electrodes;
   the second touch control electrodes comprise first parts covering the photosensitive patterns and second parts not covering the photo-sensitive patterns, and at least first parts are made of a transparent conductive material; and
   the first parts are made of ITO, and the second part are made of metal.

2. The fingerprint identification structure according to claim 1, wherein the first parts and the second parts are electrically connected by lap joints or through-holes.

3. The fingerprint identification structure according to claim 1, further comprising an insulation layer covering the first touch control electrodes,
   wherein the insulation layer is disposed between the plurality of first touch control electrodes and the plurality of photo-sensitive patterns;
   the insulation layer comprises a plurality of through-holes which have a one-to-one correspondence with the plurality of photosensitive patterns; and
   each of the photo-sensitive patterns connects to one of the first touch control electrodes by a corresponding through-hole of the through-holes.

4. The fingerprint identification structure according to claim 1, wherein the photo-sensitive patterns are made of an infrared photo-sensitive material.

5. The fingerprint identification structure according to claim 4, wherein the infrared photo-sensitive material comprises one or any combination of PBDTT, PC61BM, P3HT, PEDOT or PSS.

6. The fingerprint identification structure according to claim 1, further comprising a back-light, provided on a side, which is away from the first touch control electrodes and the second touch control electrodes, of the substrate.

7. The fingerprint identification structure according to claim 1, wherein the substrate is a display substrate or a base substrate of a display substrate.

8. An electronic device, comprising the fingerprint identification structure according to claim 1.

9. The fingerprint identification structure according to claim 1, wherein each of the photo-sensitive patterns with one of the first touch control electrodes and one of the second touch control electrodes, which are separated from each other by the each of the photo-sensitive patterns, form a photodiode.

10. The fingerprint identification structure according to claim 1, wherein the photo-sensitive patterns are photoresistors.

11. The fingerprint identification structure according to claim 1, further comprising an insulation layer covering the first touch control electrodes,
    wherein the insulation layer is disposed between the plurality of first touch control electrodes and the plurality of photo-sensitive patterns; and
    the first parts are respectively in contact with side surfaces of corresponding photo-sensitive patterns and a surface of the insulation layer away from the plurality of first touch control electrodes.

12. The fingerprint identification structure according to claim 1, wherein a layer where the plurality of first touch control electrodes are located, a layer where the plurality of photo-sensitive patterns are located, a layer where portions, which are not in contact with side surfaces of corresponding photo-sensitive patterns, of the first parts are located, and a layer where the second parts are located are sequentially provided in a direction perpendicular to the substrate; and
    portions, which are respectively overlapped with corresponding photo-sensitive patterns in the direction perpendicular to the substrate, of the first parts are overlapped with corresponding second parts in the direction perpendicular to the substrate.

13. A method for fabricating a fingerprint identification structure, comprising:
    forming a plurality of first touch control electrodes and a plurality of second touch control electrodes on a substrate, wherein the plurality of first touch control electrodes and the plurality of second touch control electrodes intersect with each other; and forming a plurality of photo-sensitive patterns on the substrate, wherein the plurality of photo-sensitive patterns are disposed at intersections of the plurality of first touch control electrodes and the plurality of second touch control electrodes, respectively, and are configured to separate the plurality of second touch control electrodes from the plurality of first touch control electrodes;

forming of the second touch control electrodes comprises:

depositing a transparent conductive material on the substrate on which the plurality of photo-sensitive patterns are formed, and patterning the transparent conductive material to form first parts, which covers the photo-sensitive patterns, of the second touch control electrodes; and depositing a second electrode material on the substrate, and patterning the second electrode material to obtain second parts, which do not cover the photo-sensitive patterns, of the second touch control electrodes, wherein the first parts electrically connect with the second parts to form the second touch control electrodes together.

14. The method according to claim 13, wherein the first parts and the second parts are electrically connected by lap joints or through-holes.

15. The method according to claim 13, wherein each of the photo-sensitive patterns with one of the first touch control electrodes and one of the second touch control electrodes, which are separated from each other by the each of the photo-sensitive patterns, form a photodiode; or, the photo-sensitive patterns are photoresistors.

16. The method according to claim 13, further comprising:

forming an insulation layer covering the first touch control electrodes, and patterning the insulation layer to form a plurality of through-holes; and forming the plurality of photo-sensitive patterns, to allow the plurality of photo-sensitive patterns to have a one-to-one correspondence with the plurality of through-holes and the plurality of photo-sensitive patterns to connect to the first touch control electrodes by a corresponding through-hole of the through-holes.

17. A fingerprint identification structure, comprising:

a substrate;

a plurality of first touch control electrodes and a plurality of second touch control electrodes, which are provided on the substrate, wherein the plurality of first touch control electrodes and the plurality of second touch control electrodes intersect with each other; and a plurality of photo-sensitive patterns, which are disposed at intersections of the plurality of first touch control electrodes and the plurality of second touch control electrodes, respectively, and are configured to separate the plurality of second touch control electrodes from the plurality of first touch control electrodes, wherein the plurality of second touch control electrodes are provided on a side, which is away from the substrate, of the plurality of first touch control electrodes;

the second touch control electrodes comprise first parts covering the photosensitive patterns and second parts not covering the photo-sensitive patterns, and at least first parts are made of a transparent conductive material;

the first parts are made of ITO, and the second part are made of metal;

each of the photo-sensitive patterns with one of the first touch control electrodes and one of the second touch control electrodes, which are separated from each other by the each of the photo-sensitive patterns, form a photodiode; and the first parts and the second parts are electrically connected by lap joints or through-holes.

* * * * *